United States Patent [19]

Fuss et al.

[11] Patent Number: 4,514,114

[45] Date of Patent: Apr. 30, 1985

[54] SEED AND/OR FERTILIZER DISTRIBUTOR

[76] Inventors: Albert K. Fuss, 1 Jellicoe St.; Eric W. Fuss, 3 Heller St.; Jarvis R. Fuss, 143 Tourist Rd.; Roy M. Fuss, 21 Leslie St., all of Toowoomba, Queensland, Australia, 4350

[21] Appl. No.: 406,698

[22] Filed: Aug. 10, 1982

[30] Foreign Application Priority Data

Jul. 8, 1982 [AU] Australia .............................. PF4770

[51] Int. Cl.³ .......................................... B65G 53/46
[52] U.S. Cl. ........................................ 406/65; 406/146
[58] Field of Search .............. 222/129, 226, 236, 238, 222/251, 328, 394, 400.7, 410, 478, 630, 148, 547, 374; 406/63–68, 135, 146

[56] References Cited

U.S. PATENT DOCUMENTS

| 1,026,641 | 5/1912 | Gardner | 222/547 |
|---|---|---|---|
| 3,011,773 | 12/1961 | Metz | 222/630 |
| 3,127,069 | 3/1964 | Tygart | 222/274 |
| 3,233,945 | 2/1966 | Kurtz | 406/68 |
| 3,656,661 | 4/1972 | Schumacher et al. | 406/65 |
| 3,762,603 | 10/1973 | Bauman et al. | 222/630 |
| 4,037,759 | 7/1977 | Grosse-Scharmann | 222/238 |
| 4,083,475 | 4/1978 | Venner et al. | 222/238 |
| 4,236,654 | 12/1980 | Mello | 222/238 |
| 4,379,664 | 4/1983 | Klein et al. | 222/630 |

FOREIGN PATENT DOCUMENTS 241691  2/1960  Australia .............................. 222/630

Primary Examiner—H. Grant Skaggs
Attorney, Agent, or Firm—Wm. T. Wofford; James C. Fails; Arthur F. Zobal

[57] ABSTRACT

An improved seed and/or fertilizer distributor of the air-seeder type having a sealed hopper and having a pressure equalizing line communicating between the hopper and a chamber in which is disposed a metering device arranged to have the same pressure on the intake as on the outlet side, with the metering device feeding into a duct opening to the air stream which conveys the seed and/or fertilizer.

10 Claims, 3 Drawing Figures

SEED AND/OR FERTILIZER DISTRIBUTOR

STATE OF THE ART

This invention relates to an improved seed and/or fertilizer distibutor and in particular in relates to a distributor of the type which is used with air seeding equipment such as is particularly used with wide span seeders having multiple points of distribution of the seed and/or fertilizer.

Machines of this type have been in use for some time and, while the invention relates generally to this type of equipment, it has been adapted particularly for use in air seeders where hoses fed from a supply through metering devices distribute the seed and/or fertilizer to multiple delivery points.

The invention is also particularly adapted for use in those machines where a series of independent seeder units are involved which may be arranged at different spacing and in different numbers but the invention is not necessarily limited to this improved type of equipment and is applicable anywhere where a series of delivery tubes or hoses convey the seed and/or fertilizer from a metering device to the delivery points.

In this type of equipment it has been customary to try and achieve a balance of pressures between the air stream which carries the seed and/or fertilizer from the hopper to a multiple distributor unit which then distributes the seed and/or fertilizer to the individual tubes or hoses, but it has been found that if the hopper containing the seed and/or fertilizer is simply left open at the top, the negative pressure at the metering device at the base of the hopper, which is generated due to the flow of the air stream at points where it picks up the seed and/or fertilizer causes problems in uniformity of feed. Similarly if the hopper is sealed there is restriction of flow through the metering devices and again a uniform flow is not achieved.

It has been proposed heretofore according to an earlier invention of ours as described in the specification of Australian Letters Pat. No. 471,659 by Albert Keith Fuss, Eric William Fuss, Jarvis Rogers Fuss and Roy Muller Fuss, to provide a bleed of air from the pressure stream to the top of the hopper, with the hopper closed by means of a sealing door, and by careful manipulation of the positioning of this air bleed system very satisfactory results have been obtained.

THE INVENTION

The object of the present invention however is to provide a more uniform flow control under a large range of varying conditions and this is achieved according to this invention by again having a sealed hopper containing the seed and/or fertilizer and having metering devices feeding the material from the sealed hopper into an air stream flowing through a delivery duct or ducts which opens to a duct at the outlet of the metering devices but instead of taking the air bleed which is used to pressurize the hopper from the pressure line to the upper part of the hopper, the pressure line is taken from the chamber in which the metering device operates so as to place the hopper under the same pressure conditions as in the chamber in which the metering device is situated, whereby it is found that a much improved feed results with better control under varying conditions.

In a simple form the invention comprises a hopper to contain seed and/or fertilizer, the hopper having a sealed top and opening at its lower part to metering means arranged to discharge measured quantities of seed and/or fertilizer into delivery duct means leading to distributor means, the metering means being disposed in a chamber opening on one side into the hopper and at the other side into a duct leading into the delivery duct means which then carry the seed and/or fertilizer to the distributor means, the metering means being situated in the chamber to open to the chamber whereby to have relatively uniform pressure over the length of the metering means, an air equalisation line communicating at one end with the chamber and at the other end with the top of the hopper.

DESCRIPTION OF PREFERRED EMBODIMENT

Figure 1:
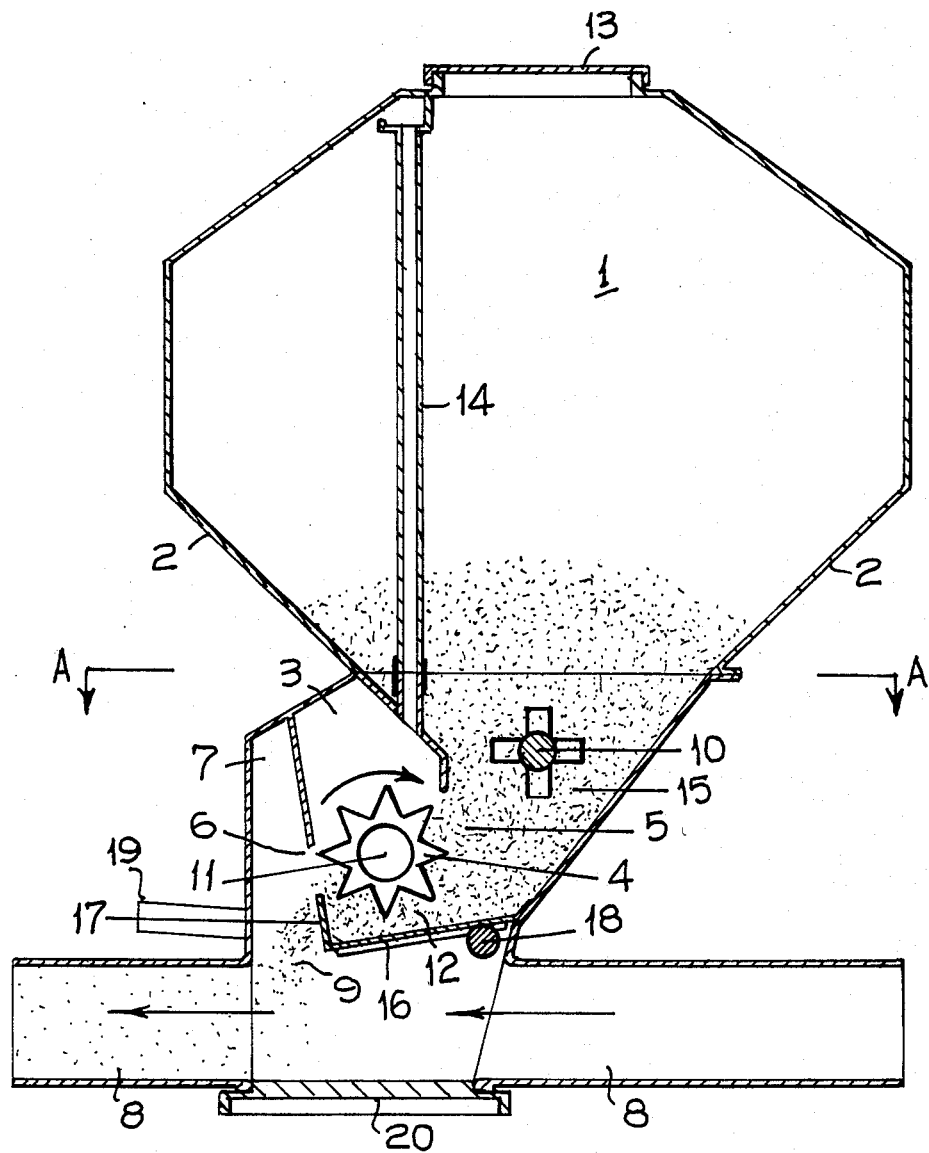
FIG. 1 is a transverse section of a typical form of the invention.

The hopper 1 has sloping surfaces 2 downwardly from the main bulk of the hopper to a chamber 3 which houses the metering devices 4, the chamber 3 which houses the metering devices having an opening 5 into the hopper 1 and on the opposite side has an opening 6 into a duct 7 which opens in to the main air pressure delivery ducts 8 which receive the seed and/or fertilizer 9 and convey it to the multiple distributor head of the machine, not shown as these are old in the Art.

Figure 2:
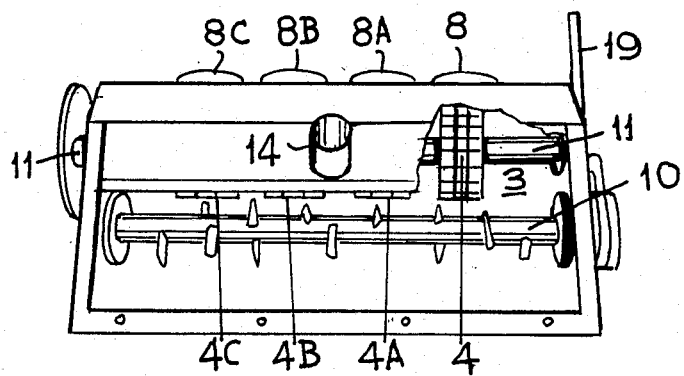
FIG. 2 is a part sectional perspective view looking down from the plane A.A.
Figure 3:
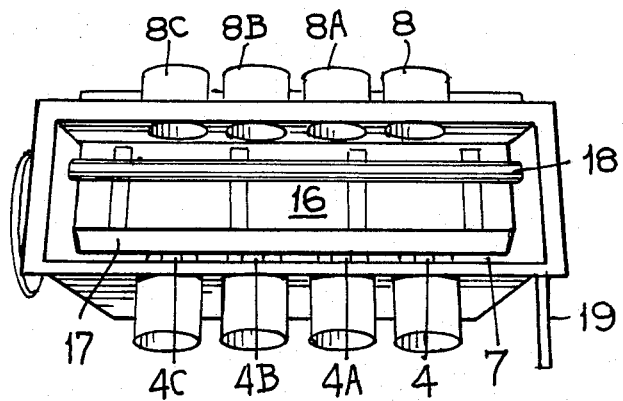
FIG. 3 is an underside schematic view with the lower cleaning door removed.

In larger machines of course there may be a series of multiple distributor heads and in that case there is a similar number of metering devices as shown in FIGS. 2 and 3 so that there is one metering device for each delivery duct to the multiple distributors. In these figures delivery ducts 8, 8A, 8B and 8C are shown.

When multiple distributors are used an agitator 10 shuffles the grain and/or fertilizer to give even supply to each metering device.

The metering devices 4 are in the form shown in the nature of stars which are fitted to a transverse shaft 11 and are spaced in the chamber so that one side of the metering device 4 is adjacent the opening 5 between the chamber 3 and the hopper 1 while the other side of it is in proximity to the discharge opening 6 between the chamber 3 and the duct 7 into which the materials are fed, and the space 12 below at least the centre of the metering device 4 is filled with seed and/or fertilizer being fed, but the upper part of the metering device 4 opens into the chamber 3 above the material flow line so that as this metering device 4 rotates it takes material from the hopper 1 and passes it through the chamber 3 and discharges it through the discharge opening 6 into the duct 7 but, as the hopper 1 is sealed by a lid 13, the delivery duct 8 which communicates with the duct 7 pressurizes the duct 7 or lowers the pressure in the duct according to the way the flow is taken past the bottom of the duct 7 but importantly whatever pressure exists in the duct also exists in the upper part at least of the chamber 3 in which the metering device 4 is positioned, and if this chamber 3 is then connected to the top of the hopper 1 by a pressure-equalising line 14 it will be realised that both sides of the metering device 4, as well as the chamber 3, are under the same pressure and there is then no differential pressure across the metering device 4, which could either cause excess feed or a starving of feed, because the sealed hopper 1 and the chamber 3 in which the metering device 4 operates are at the same pressure.

The hopper can terminate in a narrow neck 15 at the bottom which communicates with the chamber 3, the floor 16 of the chamber 3 preferably as shown being at an angle to aid the angle of the materials being handled and therefore as the metering device 4 operates in this chamber 3 both sides of the metering device 4, that is the intake side and the outlet side, are at the same air pressure which is also the pressure in the hopper 1 because of the pressure-equalising line 14 between the chamber 3 and the top of the hopper 1.

The floor 16 has a weir 17 over which the seed and/or fertilizer is discharged by the metering device, and this floor 16 is secured to a shaft 18 which has a locking handle 19 so that the floor can be swung down for cleaning.

The actual metering devices can be varied of course but must be such that they can receive seed and/or fertilizer from the hopper at one side and discharge same at a metered rate at the other side and such metering devices 4 are open to the chamber along their length to ensure that there is no differential pressure between the two ends of the metering devices 4.

The door 20 is removable to enable cleaning of the area of flow of fertilizer and/or seed, and when removed allows the floor 12 to be swung down to give access to the metering devices 4.

As stated earlier variations in the construction are possible but the general principle is to utilize a metering device 4, or a series of metering devices 4, 4A, 4B and 4C, positioned in a chamber 3 which ensures similar pressure at both ends of the metering devices and such chamber 3 is coupled by a pressure equalising line 14 to the top of the hopper 1 to maintain a uniform pressure in the chamber 3 and the hopper 1.

Consequently it is immaterial what pressure conditions exist at the outlet from the chamber 3 to the duct 7 and to the air pressure in the delivery duct 8, or multiple ducts if used, because whatever conditions the metering devices 4 are operating under, the uniform pressure is maintained between the hopper 1 and the chamber 3 which, as said, houses the metering device 4.

We claim:

1. An improved seed and/or fertilizer distributor having a hopper to contain seed and/or fertilizer, said hopper having a sealed top and opening at its lower part to metering means adapted to discharge measured quantities of seed and/or fertilizer into delivery duct means leading to distributor means, characterised by an equalizing chamber containing the said delivery means opening on a first side to the said hopper and on a second opposite side to a duct in turn opening to the said delivery duct means, said chamber extending above the said openings and having a closed top, metering means situated in the said equalizing chamber opening to the said chamber along its length and arranged to move measured quantities of seed and/or fertilizer from the said hopper to the said duct transversely through the said equalizing chamber over the floor thereof, said metering means being positioned to be confined in the said equalizing chamber between the said feed opening and the said discharge opening, and an air equalization line communicating at one end with the upper part of said equalizing chamber and at the other end with the upper part of the said hopper.

2. An improved seed and/or fertilizer distributor comprising a hopper having a sealable opening at the top and having at least one wall sloping to provide a seed and/or fertilizer delivery opening in its lower part, an equalizing chamber communicating with the said opening in the lower part of the hopper on a first side and with a discharge opening on a second opposite side, said chamber extending above the said openings and having a closed top, metering means positioned within the said chamber adapted to be driven to move seed and/or fertilizer from the opening in the said hopper transversely through the said equalizing chamber over the floor thereof and through the said discharge opening on the other side of the said equalizing chamber, said metering means being positioned to be confined in the said equalizing chamber between the said feed opening and the said discharge opening, a duct communicating with said discharge opening of the said chamber through which the seed and/or fertilizer is discharged, at least a delivery duct passing beneath the said metering means and opening to the said duct to receive seed and/or fertilizer discharged from said duct, and a line to place the said equalizing chamber above the said metering means into communication with the top of the said hopper to equalize the pressure in the said hopper with the pressure in the said equalizing chamber.

3. An improved seed and/or fertilizer distributor according to claim 2 wherein the said metering means comprise a star mounted on a transverse shaft extending through the said equalizing chamber and adapted to be driven to move measured quantities of seed and/or fertilizer from the said hopper to the said duct.

4. An improved seed and/or fertilizer distributor according to claim 2 wherein the said metering means are disposed over a floor which terminates in a weir at the said discharge opening, and the said metering means move measured quantities of seed and/or fertilizer over the said floor to discharge over the said weir into the said duct.

5. An improved seed and/or fertilizer distributor according to claim 4 wherein the said floor is attached to a shaft to allow the said floor to be swung down to expose the said metering means for cleaning.

6. An improved seed and/or fertilizer distributor according to claim 2 wherein a series of spaced metering means extend across the said equalizing chamber each situated over delivery duct means to each feed seed and/or fertilizer through the said duct to its associated delivery duct means to feed a series of distributors.

7. An improved seed and/or fertilizer distributor comprising a hopper having a sealable opening at the top and a feed opening in its lower part, an equalizing chamber on the said hopper communicating with the feed opening in the lower part of the hopper on its one side and having a discharge opening on an opposite side, said chamber extending above the said openings and having a closed top, metering means positioned within the said equalizing chamber to be confined in the said equalizing chamber between the said feed opening and the said discharge opening, adapted to be driven to move seed and/or fertilizer from the said opening in the lower part of the said hopper through said discharge opening on the other side of the said equalizing chamber over the floor thereof, a duct communicating with the said discharge opening of the said chamber through which the seed and/or fertilizer is discharged, a delivery duct passing beneath the equalizing chamber which contains the said metering means and opening to the said duct to receive seed and/or fertilizer discharged from said duct, means to place the said equalizing chamber above the said metering means into communication with the top of the said hopper to equalize the pressure in the said hopper with the pressure in the said equalizing chamber, said metering means being disposed above the said delivery duct, said metering means being adapted to be driven to move the said seed and/or fertilizer from the hopper through the said discharge opening in the said equalizing chamber.

8. An improved seed and/or fertilizer distributor comprising a hopper having a sealable opening at the top and a feed opening in its lower part, an equalizing chamber communicating with the feed opening in the lower part of the hopper on its one side and with a discharge opening on an opposite side, said chamber extending above the said openings and having a closed top, metering means positioned within the said equalizing chamber to be confined in the said equalizing chamber between the said feed opening and the said discharge opening, adapted to be driven to move seed and/or fertilizer from said opening in the lower part of said hopper through said discharge opening on said opposite side of the said equalizing chamber, over the floor thereof, a duct communicating with the discharge opening of said equalizing chamber, a delivery duct passing beneath the said metering means, and opening to a said duct, a line to place said chamber above the said metering means into communication with the top of the said hopper to equalize the pressure in the said hopper with the pressure in the said equalizing chamber, said metering means being arranged to be driven to move the seed and/or fertilizer from said hopper to the said discharge opening in the said equalizing chamber, and means in the said hopper to shuffle the seed and/or fertilizer to provide uniform supply to the said chamber.

9. An improved seed and/or fertilizer distributor comprising a hopper having a sealable opening at the top and a feed opening in its lower part, an equalizing chamber communicating with the feed opening in the lower part of the hopper on its one side and having a discharge opening on an opposite side, said chamber extending above the said openings and having a closed top, a plurality of metering means positioned within the said equalizing chamber to be confined in the said equalizing chamber between the said feed opening and the said discharge opening, adapted to be driven, to move seed and/or fertilizer from the said feed opening in the said hopper through the discharge opening on the other side of the said equalizing chamber over the floor thereof, a bottom to the said equalizing chamber having an upstanding weir forming the lower part of the said opening on the said opposite side, a duct communicating with the opening of the said equalizing chamber through which the seed and/or fertilizer is discharged, a series of delivery ducts passing beneath the said metering means and opening to the said seed and/or fertilizer receiving duct to discharge seed and/or fertilizer from each metering means into an associated delivery duct, a line to place the said equalizing chamber above the said metering means into communication with the top of the said hopper to equalize the pressure in the said hopper with the pressure in the said equalizing chamber, said metering means each comprising a star above the said associated delivery duct, said stars being mounted on a shaft positioned transversely in the said equalizing chamber and arranged to be driven in a direction to move the lower part of the said stars from the hopper toward the said discharge opening in the said chamber, and means in the said hopper to shuffle the seed and/or fertilizer to provide uniform supply to the said equalizing chamber.

10. An improved seed and/or fertilizer distributor comprising a hopper having a sealable opening at the top and a feed opening in its lower part, an equalizing chamber communicating with the opening in the lower part of the hopper on its one side and having a discharge opening on an opposite side, said chamber extending above the said openings and having a closed top, metering means positioned within the said equalizing chamber adapted to be driven to move seed and/or fertilizer from the opening in the lower part of said hopper through said discharge opening on said opposite side of the said equalizing chamber over the floor thereof—said metering means being confined in the said equalizing chamber between the said feed opening and the said discharge opening, a bottom to the said equalizing chamber having an upstanding weir forming the lower part of said discharge opening, means to adjust the angle of the said bottom, a duct communicating with the opening of the said equalizing chamber through which the seed and/or fertilizer is discharged, a delivery duct passing beneath the said metering means and opening to the said duct to receive seed and/or fertilizer discharged from said duct, a line to place said equalizing chamber above the said metering means into communication with the top of the said hopper to equalize the pressure in the said hopper with the pressure in the said equalizing chamber, said metering means comprising a star disposed above the said delivery duct, said star being mounted on a shaft projecting transversely through the said equalizing chamber and arranged to be driven in a direction to move the lower part of the said star from the said hopper toward the said discharge opening in the said equalizing chamber.

* * * * *